United States Patent
Ozawa et al.

(10) Patent No.: US 9,963,124 B2
(45) Date of Patent: May 8, 2018

(54) CONTROL DEVICE FOR VEHICLE

(71) Applicant: TOYOTA JIDOSHA KABUSHIKI KAISHA, Toyota-shi, Aichi-ken (JP)

(72) Inventors: Kazuhiro Ozawa, Toyota (JP); Masato Tateno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 15/340,095

(22) Filed: Nov. 1, 2016

(65) Prior Publication Data

US 2017/0129465 A1 May 11, 2017

(30) Foreign Application Priority Data

Nov. 11, 2015 (JP) ................................ 2015-221679

(51) Int. Cl.
| | |
|---|---|
| *G06F 7/00* | (2006.01) |
| *B60T 1/00* | (2006.01) |
| *B60T 8/58* | (2006.01) |
| *B60T 1/06* | (2006.01) |
| *B60T 8/32* | (2006.01) |

(52) U.S. Cl.
CPC .............. *B60T 1/005* (2013.01); *B60T 1/062* (2013.01); *B60T 8/58* (2013.01); *B60T 8/3205* (2013.01)

(58) Field of Classification Search
CPC . B60T 1/062; B60T 1/005; B60T 8/58; B60T 8/32; B60T 8/3205
See application file for complete search history.

(56) References Cited

U.S. PATENT DOCUMENTS

| | | | | |
|---|---|---|---|---|
| 8,423,232 | B2* | 4/2013 | Tsutsumi | B60K 6/445 477/34 |
| 2007/0225117 | A1* | 9/2007 | Shimizu | B60T 7/12 477/182 |
| 2007/0281827 | A1* | 12/2007 | Shimizu | B60T 7/107 477/92 |
| 2015/0094925 | A1* | 4/2015 | Senoo | B60T 1/005 701/70 |

FOREIGN PATENT DOCUMENTS

| | | |
|---|---|---|
| DE | 10 2010 055 921 A1 | 8/2011 |
| JP | 06-040516 U | 5/1994 |
| JP | 2011-074981 A | 4/2011 |

* cited by examiner

*Primary Examiner* — Rachid Bendidi
(74) *Attorney, Agent, or Firm* — Oliff PLC

(57) ABSTRACT

According to a parking lock control computer, in a case where there is a switching request from a non-parking lock state of a parking lock mechanism to a parking lock state based on a driver's manual operation of a P switch or a vehicle power switch, the P switch or the vehicle power switch is operated in a state where a vehicle speed V exceeds a P lock permissible vehicle speed Vp, a parking lock operation is inhibited, and a parking lock rejection history is stored, switching to the parking lock state of the parking lock mechanism by a door opening operation is permitted.

6 Claims, 5 Drawing Sheets

CONTROL DEVICE FOR VEHICLE

INCORPORATION BY REFERENCE

The disclosure of Japanese Patent Application No. 2015-221679 filed on Nov. 11, 2015 including the specification, drawings and abstract is incorporated herein by reference in its entirety.

BACKGROUND

1. Technical Field

The present embodiment relates to a control device for a parking lock mechanism which switches a parking lock mechanism to a parking lock state according to an operation of a door. In particular, the present embodiment relates to a technique for suppressing switching to the parking lock state according to a driver's unintended door operation and executing switching to the parking lock state according to a door operation in a case where the drive intends for switching to the parking lock state.

2. Description of Related Art

A control device for a vehicular parking lock mechanism including a manual operation parking lock control unit which switches the parking lock mechanism to a parking lock state at a vehicle speed equal to or lower than a predetermined vehicle speed by an actuator configured to operate in response to a command from a parking lock operating device, on which an operation input is performed manually, and a door operation parking lock control unit which switches the vehicular parking lock mechanism to the parking lock state based on an operation of a door of the vehicle is known. For example, a control device for a vehicular parking lock mechanism of Japanese Utility Model Application Publication No. 6-40516 (JP 6-40516 U) is known.

In the control device for a vehicular parking lock mechanism of JP 6-40516 U, for example, if the door is opened when it is a seat belt off state (a state where the seat belt is removed), it is a non-parking lock state, and a vehicle speed is equal to or lower than the predetermined vehicle speed which is an upper limit speed of the vehicle speed for switching from a non-parking lock state to a parking lock state, the parking lock mechanism is switched to the parking lock state by the door operation parking lock control unit. With this, for example, if the door of the vehicle is opened when switching from the parking lock state to the non-parking lock state is not performed due to an operational omission of the parking lock operating device, since the parking lock mechanism is switched to the parking lock state, getting-off of the driver in the non-parking lock state is prevented.

SUMMARY

On the other hand, for example, if the door is opened in order to confirm the rear when it is the seat belt off state, the vehicle speed is low, and reverse traveling is selected, there is a problem in that switching to the parking lock state is performed by a door opening operation regardless of having no intention of getting off. Some of car washers in North America are in a type in which a vehicle moves in a state where one wheel in a right-left direction of the vehicle is put on a slide conveyer, the parking lock mechanism is in the non-parking lock state, and the neutral position of the vehicle needs to be selected; however, if the door is opened, since switching to the parking lock state is performed, there is a possibility of causing a problem in that the driver cannot get off. In summary, when switching to the parking lock state is not intended, there is a problem in that switching to the parking lock state is performed by the door opening operation.

The embodiment is provided for suppressing switching to the parking lock state by a driver's unintended door operation and for executing switching to the parking lock state by a door operation in a case where the driver intends for switching to the parking lock state.

According to an aspect of the embodiment, there is provided a control device for a vehicle, the vehicle including a parking lock mechanism, a parking lock operating device on which an operation input is performed manually, and an actuator configured to operate in response to a command from the parking lock operating device. The control device includes a manual operation parking lock control unit configured to execute a parking lock operation to switch the parking lock mechanism to a parking lock state by the actuator at a vehicle speed equal to or lower than a predetermined vehicle speed, a door operation parking lock control unit configured to execute the parking lock operation based on an operation of a door of the vehicle, a parking lock inhibition unit configured to inhibit the parking lock operation when the parking lock operating device is operated in a state where the vehicle speed exceeds the predetermined vehicle speed, a parking lock rejection history storage unit configured to store a fact that the parking lock operation is inhibited as a parking lock rejection history until the vehicle is brought into a traveling mode state, and a parking lock permission unit configured to permit the parking lock operation in a case where the vehicle speed is equal to or lower than the predetermined vehicle speed and the parking lock rejection history is stored. An aspect of the embodiment can also be defined as follows. There is provided a control device for a vehicle, the vehicle including a parking lock mechanism, a parking lock operating device on which an operation input is performed manually, and an actuator configured to operate in response to a command from the parking lock operating device. The control device includes an electronic control unit configured to execute a parking lock operation to switch the parking lock mechanism to a parking lock state by the actuator at a vehicle speed equal to or lower than a predetermined vehicle speed, execute the parking lock operation based on an operation of a door of the vehicle, inhibit the parking lock operation when the parking lock operating device is operated in a state where the vehicle speed exceeds the predetermined vehicle speed, store a fact that the parking lock operation is inhibited as a parking lock rejection history until the vehicle is brought into a traveling mode state, and permit the parking lock operation in a case where the vehicle speed is equal to or lower than the predetermined vehicle speed and the parking lock rejection history is stored.

According to the above-described aspect, the door operation parking lock control unit configured to switch the parking lock mechanism to the parking lock state based on the operation of the door of the vehicle, the parking lock inhibition unit configured to inhibit the parking lock operation by the manual operation parking lock control unit when the parking lock operating device is operated in a state where the vehicle speed exceeds the predetermined vehicle speed, the parking lock rejection history storage unit configured to store a fact that the parking lock operation of the manual operation parking lock control unit is inhibited by the parking lock inhibition unit as the parking lock rejection history until the vehicle is brought into a traveling mode state, and the parking lock permission unit configured to permit the switching operation to the parking lock state by the door operation parking lock control unit in a case where the vehicle speed is equal to or lower than the predetermined vehicle speed and the parking lock rejection history is stored by the parking lock rejection history storage unit are provided. For this reason, in a case where the parking lock operation is inhibited and the parking lock rejection history is stored by an operation of the parking lock operating device in a state where there is a switching request to the parking lock state based on a driver's manual operation of the parking lock operating device and the vehicle speed exceeds the predetermined vehicle speed, the parking lock mechanism is switched to the parking lock state by the door operation. With this, switching of the parking lock mechanism to the parking lock state by a driver's unintended door operation is suppressed, and switching of the parking lock mechanism to the parking lock state by a door operation in a case where the driver intends for switching to the parking lock state is executed.

In the above-described aspect, the door operation parking lock control unit may be configured to execute the parking lock operation based on an operation to open the door of the vehicle.

According to the above-described configuration, the door operation parking lock control unit switches the parking lock mechanism to the parking lock state based on the operation to open the door of the vehicle. For this reason, switching of the parking lock mechanism to the parking lock state by a driver's unintended operation to open the door is suppressed, and switching of the parking lock mechanism to the parking lock state by the operation to open the door in a case where the driver intends for switching to the parking lock state is executed.

In the above-described aspect, the door operation parking lock control unit may be configured to execute the parking lock operation based on an operation to close the door after opening the door of the vehicle.

According to the above-described configuration, the door operation parking lock control unit switches the parking lock mechanism to the parking lock state based on the operation to close the door after opening the door of the vehicle. For this reason, switching of the parking lock mechanism to the parking lock state by a driver's unintended operation to close the door after opening the door is suppressed, and switching of the parking lock mechanism to the parking lock state by the operation to close the door after opening the door in a case where the driver intends for switching to the parking lock state is executed.

In the above-described aspect, the parking lock operating device may be a parking switch, and the parking lock rejection history storage unit may be configured to store a fact that the parking lock operation is inhibited as the parking lock rejection history based on a manual operation of the parking switch.

According to the above-described configuration, the parking lock operating device is a parking switch, and the parking lock rejection history storage unit stores the parking lock operation by the manual operation parking lock control unit based on the manual operation of the parking switch inhibited by the parking lock inhibition unit as the parking lock rejection history. For this reason, when the inhibition of the parking lock operation of the manual operation parking lock control unit based on the manual operation of the parking switch is stored as the parking lock rejection history, the parking lock mechanism is switched to the parking lock state by the door operation.

In the above-described aspect, the parking lock operating device may be a vehicle power switch, and the parking lock rejection history storage unit may be configured to store a fact that the parking lock operation is inhibited as the parking lock rejection history based on a manual operation of the vehicle power switch when a power supply state of the vehicle is ready-off.

According to the above-described configuration, the parking lock operating device is a vehicle power switch, and the parking lock rejection history storage unit stores the parking lock operation by the manual operation parking lock control unit inhibited by the parking lock inhibition unit as the parking lock rejection history based on the manual operation of the vehicle power switch when the power supply state of the vehicle is ready-off. For this reason, when the inhibition of the parking lock operation of the manual operation parking lock control unit is stored as the parking lock rejection history based on the manual operation of the vehicle power switch when the power supply state of the vehicle is ready-off, the parking lock mechanism is switched to the parking lock state by the door operation.

In the above-described aspect, the parking lock operating device may be an automatic return pushbutton switch configured such that an operating member of the automatic return pushbutton switch returns to an original position when operating force to the operating member is released.

According to the above-described configuration, the parking lock operating device is an automatic return type pushbutton parking switch in which, if operating force to the operating member is released, the operating member is automatically returned to the original position. For this reason, when the vehicle speed is higher than the predetermined vehicle speed, the pushbutton of the parking switch is pushed, and the parking lock operation of the manual operation parking lock control unit is inhibited, whereby in a case where switching to the parking lock state is not performed, the pushbutton of the parking switch is automatically returned to the original position with the release of operating force, and it is hard to recognize whether it is the parking lock state or the non-parking lock state merely by visually recognizing the parking switch; thus, while the driver is likely to erroneously recognize that it is the parking lock state in spite of the non-parking lock state, the parking lock mechanism is switched to the parking lock state based on the door operation from the stored parking lock rejection history. With this, in a vehicle including an automatic return type pushbutton parking switch, driver's getting off in the non-parking lock state is suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
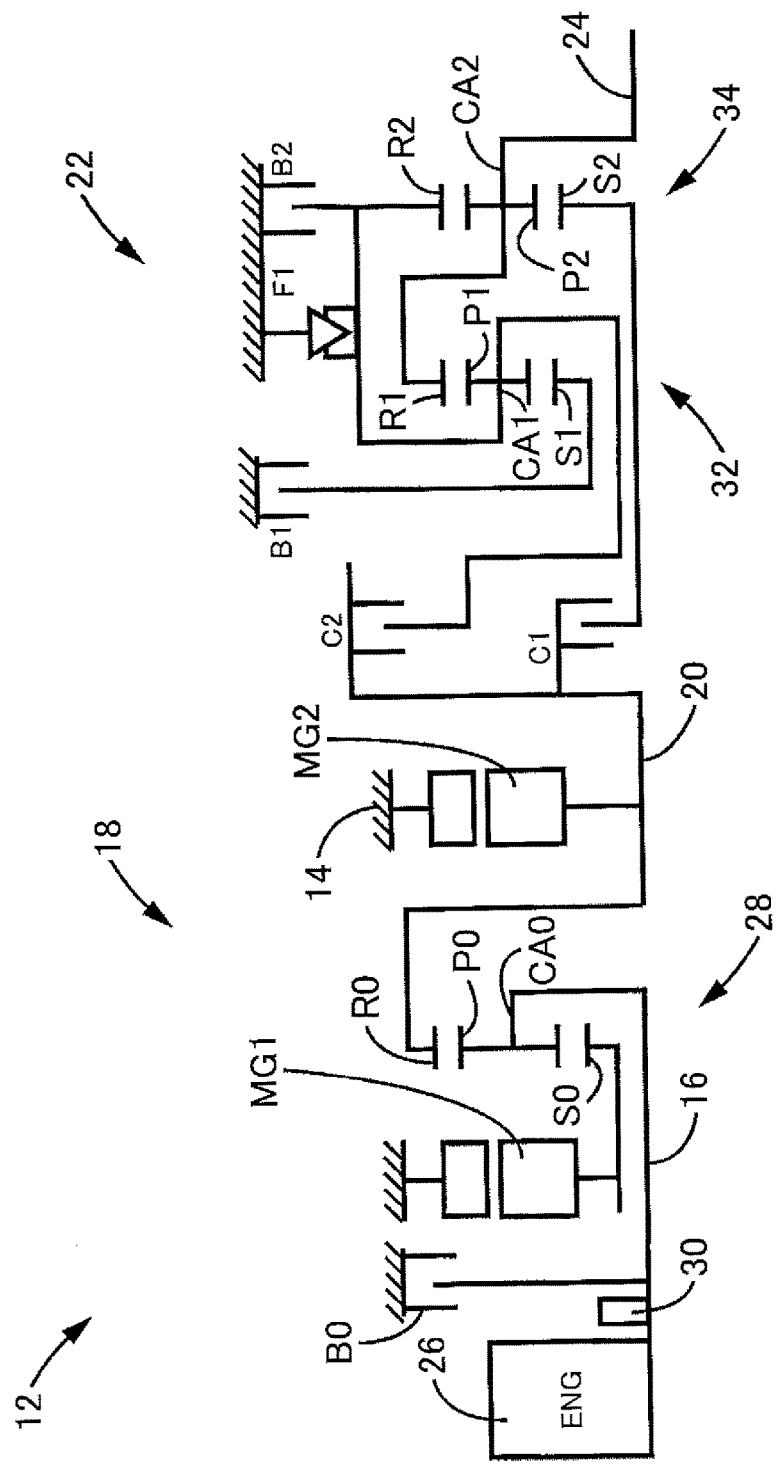
FIG. 1 is a schematic view illustrating a configuration example of a drive device for a hybrid vehicle, to which a parking lock control computer of the embodiment is applied.

Hereinafter, an example of a control device for a vehicular parking lock mechanism of the embodiment will be described in detail referring to the drawings.

FIG. 1 is a schematic view illustrating the configuration of a drive device 12 for a hybrid vehicle provided in a hybrid vehicle, to which the embodiment is applied. As shown in FIG. 1, the drive device 12 for a hybrid vehicle (hereinafter, referred to as "drive device 12") of this example includes, in series, an input shaft 16 which is provided on the common center of axis in a transmission case 14 (hereinafter, referred to as a "case 14") as a non-rotating element attached to a vehicle body, a differential unit 18 coupled directly to the input shaft 16 or coupled indirectly to the input shaft 16 through a pulsation absorption damper (vibration attenuation device) (not shown), an automatic transmission unit 22 coupled in series to a power transmission path between the differential unit 18 and drive wheels (not shown) through a transmission member (transmission shaft) 20, and an output shaft 24 coupled to the automatic transmission unit 22.

The drive device 12 of this example is suitably used for, for example, a front engine and rear drive (FR) vehicle which is longitudinally placed in a hybrid vehicle (hereinafter, referred to as a "vehicle"), and transmits drive power generated by an engine 26, which is, for example, an internal combustion engine, such as a gasoline engine or a diesel engine, as a drive power source for traveling coupled to the input shaft 16, from the output shaft 24 to a pair of drive wheels through a differential gear device (not shown) and an axle (not shown) between the differential gear device and a pair of drive wheels. In the drive device 12 of this example, the engine 26 and the differential unit 18 are directly coupled. Direct coupling refers to coupling without passing through a fluid type transmission device, such as a torque converter or fluid coupling, and for example, coupling through the above-described pulsation absorption damper or the like is included in direct coupling. Since the drive device 12 is constituted symmetrically with respect to the center of axis, in the schematic view of FIG. 1, a lower side is omitted. The same applies to respective examples described below.

The differential unit 18 includes a first electric motor MG1, a power distribution device 28 which is a mechanical mechanism for mechanically distributing the output of the engine 26 input to the input shaft 16 and a differential mechanism for distributing the output of the engine 26 to the first electric motor MG1 and the transmission member 20, and a second electric motor MG2 operatively coupled to the transmission member 20 so as to rotate integrally with the transmission member 20. The first electric motor MG1 and the second electric motor MG2 provided in the drive device 12 of this example are constituted of a three-phase AC synchronous motor having a stator with a three-phase coil wound therearound and a rotor provided with a permanent magnet, and both of the first electric motor MG1 and the second electric motor MG2 function as a so-called motor generator which functions an electric motor and a power generator. With such a configuration, the differential unit 18 functions as an electric differential unit in which an operation state thereof is controlled through the first electric motor MG1 and the second electric motor MG2, such that a differential state of an input rotation speed (the rotation speed of the input shaft 16) and an output rotation speed (the rotation speed of the transmission member 20) is controlled.

The power distribution device 28 is primarily constituted of a single pinion type planetary gear device. The planetary gear device includes, as rotating elements (elements), a sun gear S0, a planetary gear P0, a carrier CA0 which supports the planetary gear P0 rotatably and revolvably, and a ring gear R0 which meshes with the sun gear S0 through the planetary gear P0, the carrier CA0 is coupled to the input shaft 16, that is, the engine 26, the sun gear S0 is coupled to the first electric motor MG1, and the ring gear R0 is coupled to the transmission member 20. The input shaft 16 coupled to the engine 26 is selectively coupled to the case 14 as a non-rotating member through a brake B0. A mechanical hydraulic pump 30 which is rotationally driven by the engine 26 to eject hydraulic oil and stops the supply of hydraulic oil to a hydraulic control circuit when the engine 26 is stopped is coupled to the input shaft 16.

The automatic transmission unit 22 is primarily constituted of a single pinion type planetary gear device 32 and a planetary gear device 34 in a power transmission path between the differential unit 18 and the drive wheels (not shown), and is a planetary gear type multistage transmission which functions as a stepped automatic transmission. The planetary gear devices 32, 34 respectively include sun gears S1, S2, planetary gears P1, P2, carriers CA1, CA2 which support the planetary gears P1, P2 rotatably and revolvably, and ring gears R1, R2 which mesh with the sun gears S1, S2 through the planetary gears P1, P2.

In the automatic transmission unit 22, the sun gear S1 is selectively coupled to the case 14 through a brake B1. The carrier CA1 and the ring gear R2 are coupled integrally, are selectively coupled to the case 14 through a second brake B2, and are configured such that rotation in one direction with respect to the case 14 is permitted and rotation in an opposite direction is prevented through a one-way clutch µ1. The sun gear S2 is selectively coupled to the transmission member 20 through a first clutch C1. The carrier CA1 and the ring gear R2 coupled integrally are selectively coupled to the transmission member 20 through a second clutch C2. The ring gear R1 and the carrier CA2 are coupled integrally and are coupled to the output shaft 24. Though not shown in FIG. 1, a parking gear 38 of the parking lock mechanism 37 is fixedly coupled to the output shaft 24.

In the automatic transmission unit 22, a first-speed gear position is established by the engagement of the first clutch C1 and the second brake B2, a second-speed gear position is established by the engagement of the first clutch C1 and the first brake B1, a third-speed gear position is established by the engagement of the first clutch C1 and the second clutch C2, a fourth-speed gear position is established by the engagement of the second clutch C2 and the first brake B1, and a reverse gear position (reverse shift gear stage) is established by the engagement of the first clutch C1 and the second brake B2. The automatic transmission unit 22 is brought into a neutral "N" state, for example, by releasing all of the first clutch C1, the second clutch C2, the first brake B1, and the second brake B2. The differential unit 18 is brought into a state where a pair of drive wheels are drivable with both of the first electric motor MG1 and the second electric motor MG2, that is, a bi-drive state by the engagement with the brake B0, and the vehicle travels with a motor if the automatic transmission unit 22 is brought into a state where power is transmittable.

Figure 2:
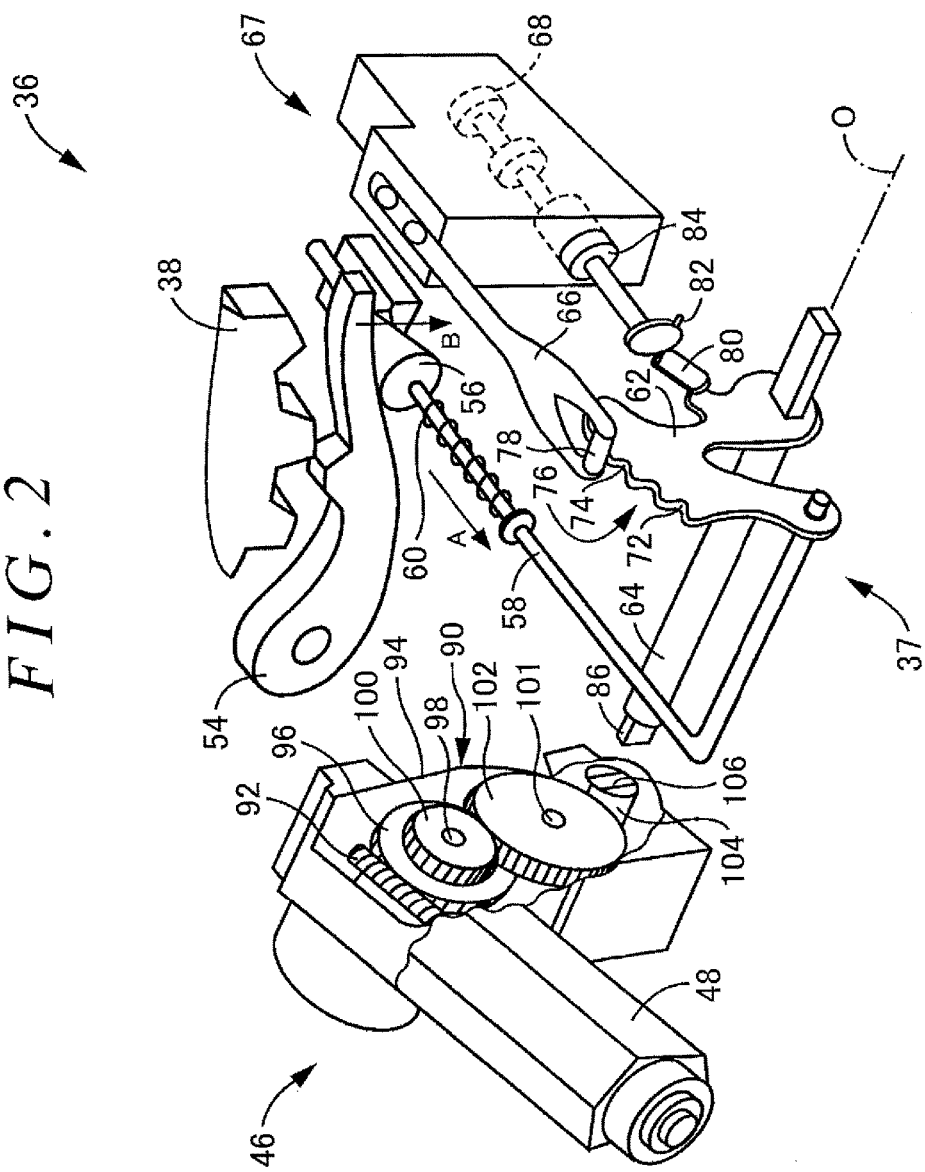
FIG. 2 is a perspective view of an electric actuator, a parking lock mechanism, and the like provided in the drive device for a hybrid vehicle of FIG. 1.

FIG. 2 is a diagram showing the configuration of a shift-by-wire type traveling control mode switching device 36 provided in the drive device 12. The traveling control mode switching device 36 includes an electric actuator 46, a parking lock mechanism 37 which switches a parking lock state and a non-parking lock state of the output shaft 24 by the electric actuator 46, and a manual valve 68. The parking lock mechanism 37 includes a parking gear 38 which is fixed to the output shaft 24 operatively coupled to the drive wheels (not shown), a parking lock pole 54 which is provided to be rotatable to a meshing position in mesh with the parking gear 38 and selectively locks the rotation of the parking gear 38, a control rod 58 which is inserted into a tapered cam portion 56 in contact with the parking lock pole 54 and supports the tapered cam portion 56 in one end portion, a spring 60 which is provided in a control rod 58 and presses the tapered cam portion 56 in a small diameter direction thereof, a detent lever 62 which is fixed to and supported by a control shaft 64 and is rotatably connected to the other end portion of the control rod 58 to be positioned at a parking lock position and a non-parking lock position by a detent mechanism, and a detent spring 66 which gives moderation to the rotation of the detent lever 62 and holds the detent lever 62 at one rotation position among the parking lock position and a plurality of non-parking lock positions. The detent lever 62 supported by the control shaft 64 is rotated around one rotation center line O by an electric motor 48 (SBW motor).

FIG. 2 shows a case where the parking lock mechanism 37 is in the non-parking lock state. The position where the parking lock pole 54 comes into contact with the tapered cam portion 56 provided at one end of the control rod 58 is changed, whereby the position of the parking lock pole 54 is adjusted. For example, the tapered cam portion 56 is moved in a direction of arrow A, and in a case where the parking lock pole 54 comes into contact with a small diameter portion of the tapered cam portion 56, when the tip of the parking lock pole 54 is moved vertically downward (in a direction of arrow B), the meshed state between the parking lock pole 54 and the parking gear 38 is released, and the parking lock state of the parking lock mechanism 37 is released (FIG. 2). In a case where the parking lock pole 54 comes into contact with a large diameter portion of the tapered cam portion 56, the parking gear 38 and the parking lock pole 54 mesh with each other, whereby the parking lock mechanism 37 is brought into the parking lock state (not shown). In a case where the parking lock mechanism 37 is in the parking lock state, the parking lock pole 54 and the parking gear 38 mesh with each other, whereby the rotation of the parking gear 38 is prevented, and the rotation of the drive wheels is also prevented similarly.

The movement of the control rod 58 in an axial direction is adjusted according to the rotation position of the control shaft 64, that is, the rotation position of the detent lever 62. The detent lever 62 is operatively coupled to an output gear 104 of the electric actuator 46 through the control shaft 64, and is rotationally driven around one rotation axis O by the electric actuator 46 along with the control rod 58. The detent lever 62 is a plate-shaped member, and has a lower end portion to which the control shaft 64 is fixed and an upper end portion in which an engagement groove 76 including a parking groove 72 and a plurality of non-parking grooves, such as a neutral groove 74, is provided. The detent spring 66 is a plate spring, and has a base portion fixed to a valve body 67, and a tip portion in which an engagement roller 78 supported rotatably is provided in a state of being pressed so as to be engaged with the groove bottom of the engagement groove 76 of the detent lever 62. The manual valve 68 is engaged with the detent lever 62 through a pin 82 provided in an arm portion 80 of the detent lever 62 in one end portion thereof. A spool 84 of the manual valve 68 is provided to be movable in the axial direction in the valve body 67 with the rotation of the detent lever 62, and the position thereof in the axial direction is determined according to the rotation position of the detent lever 62. With this, an oil passage of the manual valve 68 is switched to an oil passage according to a traveling control mode relating to traveling of the vehicle. Here, when the rotation position of the control shaft 64, that is, the detent lever 62 is at the parking lock position (P position) where the engagement roller 78 of the detent spring 66 is engaged with the parking groove 72, the traveling control mode (shift range) is a parking (P) mode (P range), and when the rotation position of the detent lever 62 is at the non-parking lock position (non-P position) where the engagement roller 78 is engaged with the non-parking groove, such as the neutral groove 74, the traveling control mode (shift range) is, for example, a non-parking (non-P) mode (non-P range), such as a neutral (N) mode (N range), or a drive (D) mode (D range), a reverse (R) mode (R range).

Each traveling control mode will be described. The R mode which is selected by shift-operating a shift lever 112 to an R operation position is a reverse traveling mode in which drive power for moving the vehicle backward is transmitted to the drive wheels. The N mode which is selected by shift-operating the shift lever 112 to an N operation position is a neutral mode for bringing a neutral state where the power transmission path is shut off. The D mode which is selected by shift-operating the shift lever 112 to a D operation position is a forward traveling mode in which drive power for moving the vehicle forward is transmitted to the drive wheels. The R mode, the N mode, and the D mode correspond to a traveling mode state of the embodiment. The P mode which is selected in a case where predetermined conditions are satisfied when a pushbutton of a P switch 114 is operated in a state where the traveling control mode is the non-P mode is a parking mode in which the power transmission path is shut off and the parking lock mechanism 37 is brought into the parking lock state. When the traveling control mode is the non-P mode, the parking lock mechanism 37 is in the non-parking lock state.

For example, in a case where the D mode is selected, the spool 84 is moved to a position in the axial direction corresponding to a D position among the non-P positions of the detent lever 62 and the oil passage of the manual valve 68 is switched to a state corresponding to the D mode in which forward traveling hydraulic pressure required for transmitting drive power for moving the vehicle forward to the drive wheels is output. The forward traveling hydraulic pressure is adjusted by a linear solenoid valve or the like and is supplied to a hydraulic frictional engagement device, such as the first clutch C1, and in the automatic transmission unit 22, the first-speed gear position or the like is established. In this way, in the vehicle of this example, the electric actuator 46 is driven based on an operation of a shift operating device 110, whereby the spool 84 of the manual valve 68 is moved in the axial direction through the detent lever 62 and the traveling control mode is switched.

In a left end portion in FIG. 2 as one end portion of the control shaft 64, an engagement portion 86 having a rectangular section is formed. The engagement portion 86 is connected to the output gear 104 of the electric actuator 46. The electric actuator 46 includes electric motor 48 and a reduction gear mechanism 90. In an output shaft of the electric motor 48, a worm gear 92 is formed. A worm wheel 96 which is coupled to a shaft 98 rotatably supported by a casing 94 meshes with the worm gear 92. A small diameter gear 100 is fixed to the shaft 98. A large diameter gear 102 which is formed in a intermediate shaft 101 rotatably supported by the casing 94 meshes with the small diameter gear 100. The fan-shaped output gear 104 in which meshing teeth is formed in a partial arc shape meshes with the small diameter gear which is formed in the intermediate shaft 101. The output gear 104 is rotatably supported by the casing 94, and an engagement hole 106 having a rectangular section is formed at the rotation center thereof. The reduction gear mechanism 90 is constituted of a gear train of the small diameter gear 100 of the shaft 98, the large diameter gear 102 of the intermediate shaft 101, the small diameter gear of the intermediate shaft 101, the output gear 104, and the like. The engagement portion 86 of the control shaft 64 is engaged with the engagement hole 106 of the output gear 104.

Figure 3:
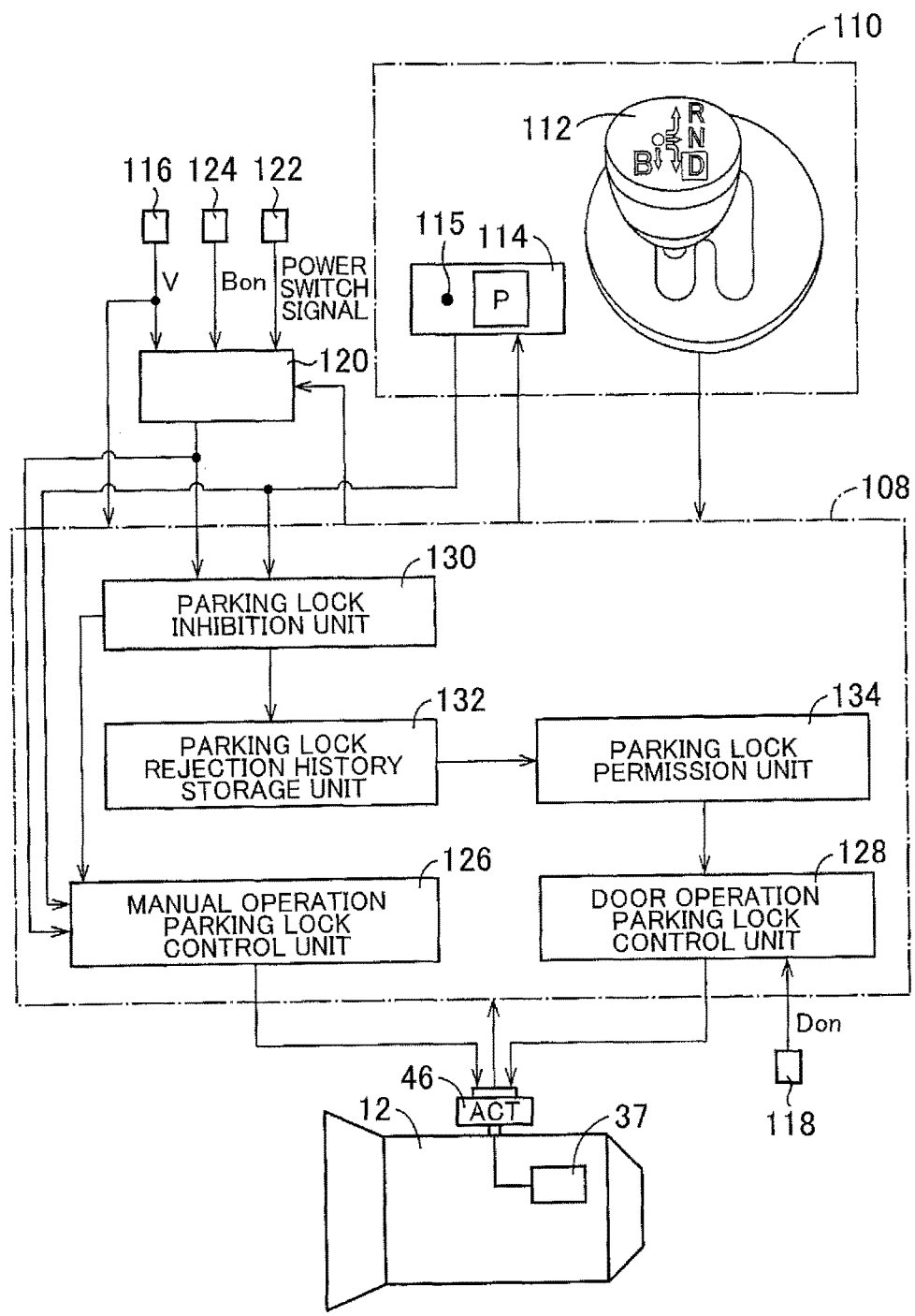
FIG. 3 is a diagram illustrating a parking lock control computer which controls the operation of the parking lock mechanism of FIG. 2 along with a shift operating device, and shows functional blocks illustrating a main part of a control function in the parking lock control computer.

FIG. 3 is a diagram illustrating a parking lock control computer 108 (SBW-ECU 108) and a power supply control computer 120 (PM-ECU 120). The parking lock control computer 108 and the power supply control computer 120 include a so-called microcomputer having a CPU, a ROM, a RAM, an input-output interface, and the like, and perform signal processing according to programs stored in advance in the ROM while using a temporary storage function of the RAM. A shift lever position signal output according to the operation position of the shift lever 112 of the shift operating device 110 and a P switch signal as a switching request to the P mode according to a push operation of the pushbutton of the parking switch 114 (P switch (P-SW) 114) are supplied to the parking lock control computer 108. A signal representing a vehicle speed V detected by a vehicle speed sensor 116, a signal representing a door open state Don where the door of the vehicle is open from a door open/close switch 118 for detecting the open/closed state of the door of the vehicle, and the like are also supplied to the parking lock control computer 108.

The shift operating device 110 includes an automatic return type operator which is provided, for example, near a driver's seat, and is operated to a plurality of shift operation positions, that is, the shift lever 112 which, if operating force is released, is automatically returned to an original position (M position). The shift operating device 110 includes the automatic return type, that is, the momentary pushbutton type P switch 114 for operating parking lock near the shift lever 112 as a separate switch.

As shown in FIG. 3, the shift lever 112 is operated to each of an R operation position, an N operation position, and a D operation position which are three operation positions Psh arranged in a vertical direction, and an M operation position and a B operation position arranged in parallel thereto, and the shift operating device 110 outputs the shift lever position signal according to the shift operation position Psh of the shift lever 112 to the parking lock control computer 108.

The P switch 114 is, for example, an automatic return type, that is, a momentary pushbutton type switch in which, if operating force to a pushbutton as an operating member is released, the pushbutton is automatically returned to an original position, and outputs the P switch signal to the parking lock control computer 108 each time the switch is pushed by the user. A P position indicator lamp 115 is embedded in the P switch 114, and the P position indicator lamp 115 is turned on based on a P position signal indicating the operation state of parking lock of the parking lock mechanism 37 in a case where it is the parking lock state.

The M operation position of the shift operating device 110 is an initial position (home position) of the shift lever 112, and even if a shift operation is performed to an operation position Psh (R, N, D, B operation position) other than the M operation position, if the driver releases the shift lever 112, that is, if external force applied to the shift lever 112 is eliminated, the shift lever 112 is returned to the M operation position by a mechanical mechanism, such as a spring.

A Ready-OFF auto P lock switching request signal for switching the parking lock mechanism 37 to the parking lock state at the time of vehicle power supply OFF (Ready-OFF) is supplied from the power supply control computer 120 (PM-ECU 120) to the parking lock control computer 108 regardless of an operation of the P switch 114. The power supply control computer 120 switches from vehicle power supply OFF to vehicle power supply ON, for example, when a power switch operation signal from an automatic return type, that is, a momentary pushbutton type vehicle power switch 122 operated by the driver is supplied, a key is carried with the driver, and it is a brake on state Bon, and switches the vehicle power supply from ON to OFF when it is at least a brake off state Boff. In addition to a power switch signal representing a switch operation in the vehicle power switch 122, for example, a signal representing the vehicle speed V detected by the vehicle speed sensor 116, a P lock state signal representing whether the parking lock mechanism 37 is in the parking lock state or in the non-parking lock state from the parking lock control computer 108, a brake operation signal representing the brake on state Bon from a brake switch 124 indicating that a foot brake pedal (not shown) for detecting a operation of a common brake is operated, and the like are supplied to the power supply control computer 120. The power supply control computer 120 determines whether or not predetermined conditions for starting auto parking lock (auto P lock) control for automatically the parking lock mechanism 37 from the non-parking lock state to the parking lock state at the time of vehicle power supply OFF are established. The power supply control computer 120 determines that the above-described predetermined conditions are established if the power supply state of the vehicle is the ON state, the vehicle speed V is lower than a predetermined vehicle speed Vr, and a switching request to the vehicle power supply OFF state is recognized by an operation of the vehicle power switch 122 when the parking lock mechanism 37 is in the non-parking lock state, and outputs the Ready-OFF auto P lock switching request signal to the parking lock control computer 108.

In the parking lock control computer 108 of FIG. 3, functional blocks indicating a main part of the control function are shown. The parking lock control computer 108 includes a manual operation parking lock control unit 126, a door operation parking lock control unit 128, a parking lock inhibition unit 130, a parking lock rejection history storage unit 132, and a parking lock permission unit 134.

The parking lock control computer 108 functions as a control device for a parking lock mechanism which drives the electric actuator 46 and controls the operation of the parking lock mechanism 37 switchable between the parking lock state and the non-parking lock state. The manual operation parking lock control unit 126 outputs a manual operation P lock switching signal for switching the parking lock mechanism 37 to the parking lock state to the electric actuator 46 at a vehicle speed equal to or lower than a P lock permissible vehicle speed Vp according to the P switch signal input by a manual operation of the P switch 114 or the Ready-OFF auto P lock switching request signal input from the power supply control computer 120 by a manual operation of the vehicle power switch 122, and rotationally drives the control shaft 64 to the parking lock position (P position) to switch the parking lock mechanism 37 to the parking lock state. Here, the P lock permissible vehicle speed Vp is an upper limit value of the vehicle speed V at which switching of the parking lock mechanism 37 to the parking lock state is permitted, and is determined experimentally in advance. The predetermined vehicle speed Vr which is one of the conditions for starting the auto parking lock control is a value greater than the P lock permissible vehicle speed Vp, and is determined experimentally in advance. The parking lock control computer 108 rotationally drives the electric motor 48 according to the shift lever position signal in a case where it is the brake on Bon and the parking lock mechanism 37 is in the parking lock state to rotate the control shaft 64 to the non-parking lock position (not P position), and switches the parking lock mechanism 37 to the non-parking lock state. The P switch 114 and the vehicle power switch 122 correspond to a parking lock operating device of the embodiment, and the P lock permissible vehicle speed Vp corresponds to a predetermined vehicle speed of the embodiment.

On the other hand, the door operation parking lock control unit 128 which automatically switches the parking lock mechanism 37 to the parking lock state based on a door opening operation to open the door of the vehicle is provided in order to prevent driver's getting off in a state where the vehicle speed V when a manual operation of the P switch 114 or the vehicle power switch 122 is performed by the driver is higher than the P lock permissible vehicle speed Vp and the parking lock mechanism 37 is not actually switched to the parking lock state. There is a case where the vehicle speed V at the time of the operation of the P switch 114 is higher than the P lock permissible vehicle speed Vp, and the driver is unaware of the parking lock mechanism 37 in the non-parking lock state as ever. As described above, in a case where the driver intends for switching of the parking lock mechanism 37 to the parking lock state, the parking lock control computer 108 switches the parking lock mechanism 37 to the parking lock state based on the door opening operation. The parking lock control computer 108 does not permit switching of the parking lock mechanism 37 to the parking lock state based on a driver's unintended door opening operation.

The parking lock inhibition unit 130 inhibits the parking lock operation by the manual operation parking lock control unit 126 when the P switch 114 or the vehicle power switch 122 is operated in a state where the vehicle speed exceeds the P lock permissible vehicle speed Vp. If the P switch signal supplied by a manual operation of the P switch 114 or the Ready-OFF auto P lock switching request signal supplied from the power supply control computer 120 is acquired when the predetermined conditions for starting the auto parking lock by a manual operation of the vehicle power switch 122 are established, the parking lock inhibition unit 130 determines that the vehicle speed V is equal to or lower than the P lock permissible vehicle speed Vp. The parking lock inhibition unit 130 outputs a manual operation P lock inhibition signal for inhibiting switching of the parking lock mechanism 37 to the parking lock state to the manual operation parking lock control unit 126 in a case where the vehicle speed V is higher than the P lock permissible vehicle speed Vp. The parking lock inhibition unit 130 inhibits switching of the parking lock mechanism 37 to the parking lock state, and outputs an N mode switching command signal for switching from the traveling control mode other than the N mode to the N mode to the electric actuator 46 to switch the traveling control mode to the N mode. In a case where the vehicle speed V is equal to or lower than the P lock permissible vehicle speed Vp, the parking lock inhibition unit 130 does not output the manual operation P lock inhibition signal to the manual operation parking lock control unit 126 and permits switching of the parking lock mechanism 37 to the parking lock state by the manual operation parking lock control unit 126.

The parking lock rejection history storage unit 132 determines whether or not the parking lock operation by the manual operation parking lock control unit 126 is inhibited by the parking lock inhibition unit 130 based on whether or not the conditions that there is a switching request of the parking lock mechanism 37 to the parking lock state according to the P switch signal by a manual operation of the P switch 114 or the Ready-OFF auto P lock switching request signal by a manual operation of the vehicle power switch 122 when the predetermined conditions are established, that is, a switching request to the P mode and the traveling control mode is the N mode are satisfied. In a case where the above-described conditions are satisfied, the parking lock rejection history storage unit 132 determines that switching of the parking lock mechanism 37 to the parking lock state through the electric actuator 46 by the manual operation parking lock control unit 126, that is, the parking lock operation is inhibited by the parking lock inhibition unit 130 based on a manual operation of the P switch 114 or when the power supply state of the vehicle is ready-off based on a manual operation of the vehicle power switch 122, and stores the parking lock operation by the manual operation parking lock control unit 126 inhibited by the parking lock inhibition unit 130 as a parking lock rejection history (P switching operation rejection history). The parking lock rejection history storage unit 132 does not store the parking lock rejection history, for example, in a case where the above-described conditions are not satisfied, such as a case where the parking lock mechanism 37 is switched to the parking lock state in response to the switching request to the P mode by the manual operation parking lock control unit 126. The parking lock rejection history storage unit 132 resets the previously stored parking lock rejection history in a case where the vehicle is brought into the traveling mode state of the R mode, the N mode, or the D mode by an operation to the R operation position, the N operation position, or the D operation position of the shift lever 112. In other words, the parking lock rejection history storage unit 132 stores the parking lock rejection history until the vehicle is brought into the traveling mode state.

The parking lock permission unit 134 determines whether or not the conditions that the vehicle speed V is equal to or lower than the P lock permissible vehicle speed Vp and the parking lock rejection history is stored in the parking lock rejection history storage unit 132 are satisfied. In a case where the above-described conditions are satisfied, the parking lock permission unit 134 outputs a door operation P lock permission signal for permitting switching of the parking lock mechanism 37 to the parking lock state by the door operation parking lock control unit 128 based on the operation to open the door of the vehicle to the door operation parking lock control unit 128. In a case where the above-described conditions are not satisfied, the parking lock permission unit 134 does not output the door operation P lock permission signal to the door operation parking lock control unit 128, and does not permit switching of the parking lock mechanism 37 to the parking lock state by the door operation parking lock control unit 128 at the time of the door opening operation.

The door operation parking lock control unit 128 outputs a door opening operation auto P lock switching request signal for switching the parking lock mechanism 37 to the parking lock state to the electric actuator 46 at the time of the door opening operation at which the closed door is opened and the door open signal indicating the door open signal Don from the door open/close switch 118 is switched from OFF to ON in a state where the door operation P lock permission signal output from the parking lock permission unit 134 is supplied in a case where the vehicle speed V is equal to or lower than the P lock permissible vehicle speed Vp and the parking lock rejection history is stored, switches the traveling control mode from the N mode to the P mode, and brings the parking lock mechanism 37 into the parking lock state. In a case where the door operation P lock permission signal is not supplied at the time of the door opening operation, the door operation parking lock control unit 128 does not output the door opening operation auto P lock switching request signal when the door open signal is switched from OFF to ON to the electric actuator 46, and does not switch the parking lock mechanism 37 to the parking lock state.

With this, for example, in a case where the driver does not intend for switching of the parking lock mechanism 37 to the parking lock state, such as a case where the vehicle speed is equal to or lower than the P lock permissible vehicle speed Vp, the traveling control mode is switched from the D mode to the R mode, and the driver opens the door to confirm the rear, or in a case where the vehicle speed is equal to or lower than the P lock permissible vehicle speed Vp and the driver opens the door to get off in the N mode, the parking lock rejection history is not stored; thus, the parking lock is not operated by the door opening operation. For example, in a case where there is a significant change in vehicle speed V, such as at the time of sudden stopping, the vehicle speed V which is detected by the vehicle speed sensor 116 is likely to be detected to be higher than an actual vehicle speed. For this reason, the P switch 114 or the vehicle power switch 122 is manually operated in a state where the vehicle speed V is higher than the P lock permissible vehicle speed Vp, and even though switching of the parking lock mechanism 37 to the parking lock state is not intended by the driver, the parking lock operation by the manual operation parking lock control unit 126 is likely to be inhibited. However, in such a case, since the parking lock rejection history is stored, if the vehicle speed V is equal to or lower than the predetermined vehicle speed Vp, the parking lock is operated by the door opening operation at the time of driver's getting off, and thus, the movement of the vehicle after driver's getting off is prevented.

Figure 4:
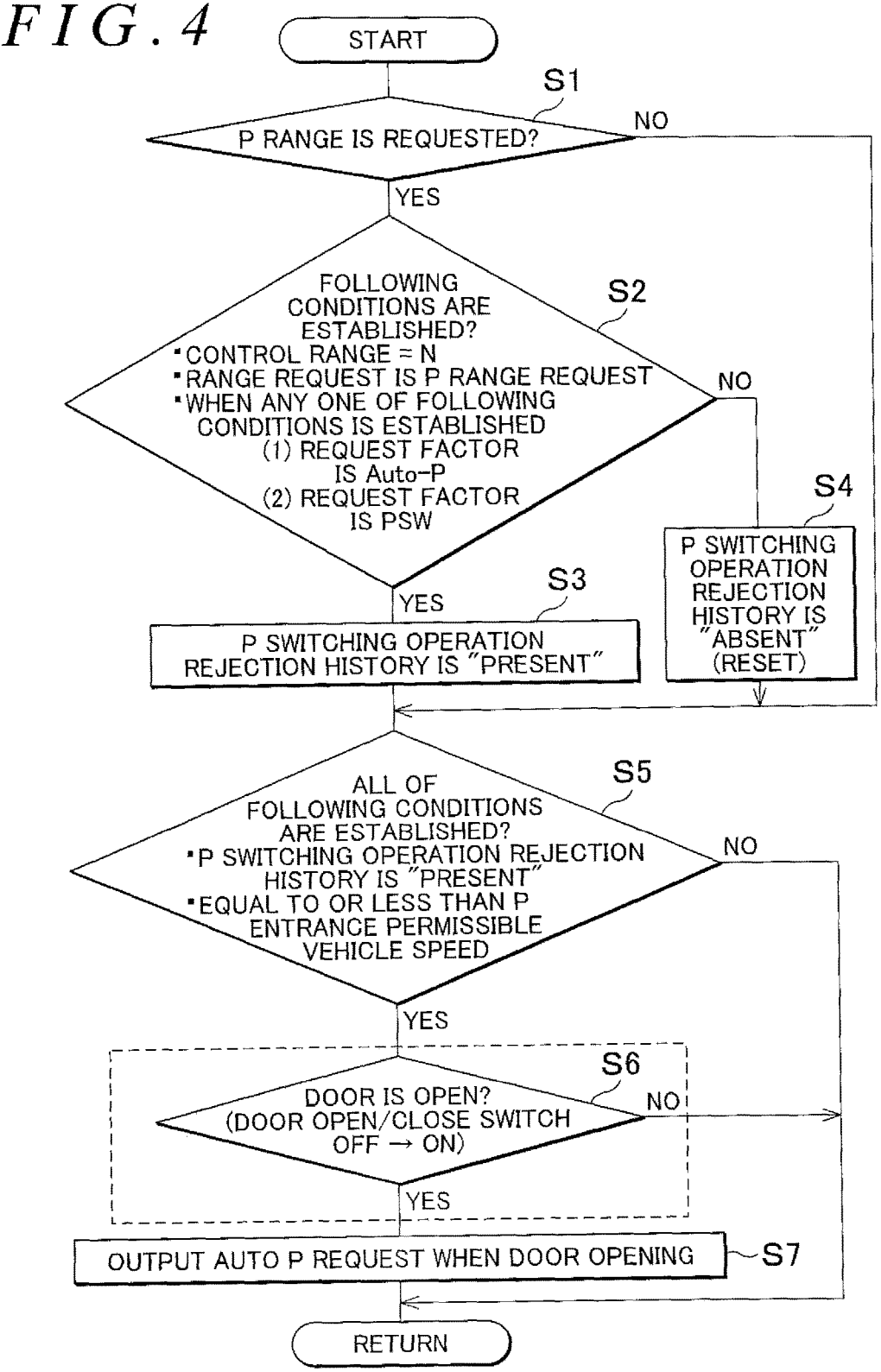
FIG. 4 is a flowchart illustrating a main part of the control operation of the parking lock control computer of FIG. 3.

FIG. 4 is a flowchart showing a main part of a control operation of the parking lock control computer 108. In Step (hereinafter, "Step" will be omitted) S1 corresponding to the function of the parking lock inhibition unit 130, it is determined whether or not there is a switching request to the P mode (P range). In a case where the determination of S1 is affirmative, S2 is executed. In a case where the determination of S1 is negative, S5 is executed. In S2 corresponding to the function of the parking lock rejection history storage unit 132, it is determined whether or not the parking lock operation of the manual operation parking lock control unit 126 is inhibited by the parking lock inhibition unit 130 based on whether or not the conditions that there is a switching request of the parking lock mechanism 37 to the parking lock state by the P switch signal by a manual operation of the P switch 114 or by the Ready-OFF auto P lock switching request signal when the predetermined conditions are established by a manual operation of the vehicle power switch 122, that is, a switching request to the P mode, and the traveling control mode is the N mode. In a case where the determination of S2 is affirmative, in S3 corresponding to the function of the parking lock rejection history storage unit 132, the parking lock rejection history is stored, and the parking lock rejection history is set to be present. After S3 is executed, S5 is executed. In a case where the determination of S2 is negative, in S4 corresponding to the function of the parking lock rejection history storage unit 132, the parking lock rejection history is not stored, and the parking lock rejection history is set to be absent. In a state where the parking lock rejection history is stored, in a case where the vehicle is brought into the traveling mode state by an operation of the shift lever 112 to the R operation position, the N operation position, or the D operation position and the determination of S2 is negative, in S4, the previously stored parking lock rejection history is reset and the parking lock rejection history is changed from "present" to "absent". After S4 is executed, S5 is executed. In S5 corresponding to the function of the parking lock permission unit 134, it is determined whether or not where the history parking lock rejection history is present with the parking lock rejection history stored and the vehicle speed V is equal to or lower than the P lock permissible vehicle speed (P entrance permissible vehicle speed) Vp. In a case where the determination of S5 is affirmative, S6 is executed, and in a case where the determination of S5 is negative, this flowchart ends. In S6 corresponding to the function of the door operation parking lock control unit 128, it is determined whether or not the door opening operation of the vehicle is performed. In a case where the determination of S6 is affirmative, S7 is executed, and in a case where the determination of S6 is negative, this flowchart ends. In S7 corresponding to the function of the door operation parking lock control unit 128, the door opening operation auto P lock switching request signal is output to the electric actuator 46 at the time of the door opening operation, and the parking lock mechanism 37 is switched to the parking lock state based on the door opening operation of the vehicle.

As described above, the parking lock control computer 108 of this example includes the door operation parking lock control unit 128 which switches the parking lock mechanism 37 to the parking lock state based on the door opening operation to open the door of the vehicle, the parking lock inhibition unit 130 which inhibits the parking lock operation of the manual operation parking lock control unit 126 when the P switch signal by a manual operation of the P switch 114 or the Ready-OFF auto P lock switching request signal from the power supply control computer 120 when the predetermined conditions for starting the auto P lock control at the time of Ready-OFF are established by a manual operation of the vehicle power switch 122 is input in a state where the vehicle speed V exceeds the P lock permissible vehicle speed Vp, the parking lock rejection history storage unit 132 which stores the parking lock operation of the manual operation parking lock control unit 126 inhibited by the parking lock inhibition unit 130 as the parking lock rejection history until the vehicle is brought into the traveling mode state by an operation of the shift lever 112 to the R operation position, the N operation position, or the D operation position, and the parking lock permission unit 134 which permits the switching operation to the parking lock state by the door operation parking lock control unit 128 in a case where the vehicle speed V is equal to or lower than the P lock permissible vehicle speed Vp and the parking lock rejection history is stored in the parking lock rejection history storage unit 132. For this reason, in a case where the P switch 114 or the vehicle power switch 122 is operated, the parking lock operation is inhibited, and the parking lock rejection history is stored in a state where there is a switching request to the parking lock state based on a driver's manual operation of the P switch 114 or the vehicle power switch 122 and the vehicle speed V exceeds the P lock permissible vehicle speed Vp, the parking lock mechanism 37 is switched to the parking lock state by the door opening operation. With this, switching of the parking lock mechanism 37 to the parking lock state by a driver's unintended door opening operation is suppressed, and in a case where the driver intends for switching to the parking lock state, switching of the parking lock mechanism 37 to the parking lock state by the door opening operation is executed.

According to the parking lock control computer 108 of this example, the P switch 114 is an automatic return type pushbutton switch which includes a pushbutton as an operating member, and if operating force to the pushbutton is released, the pushbutton is automatically returned to the original position. For this reason, in a case where the pushbutton of the P switch 114 is pushed when the vehicle speed V is higher than the P lock permissible vehicle speed Vp, the parking lock operation of the manual operation parking lock control unit 126 is inhibited, and switching to the parking lock state is not performed, when operating force is released, the pushbutton of the P switch 114 is automatically returned to the original position, and it is hard to recognize whether it is the parking lock state or the non-parking lock state merely by visually recognizing the P switch 114; thus, while the driver is likely to erroneously recognize that it is the parking lock state in spite of the non-parking lock state, the parking lock mechanism 37 is switched to the parking lock state based on the door opening operation from the stored parking lock rejection history. With this, in a vehicle including the P switch 114 which is an automatic return type pushbutton switch, driver's getting off in the non-parking lock state is suppressed Next, another example of the embodiment will be described. In the following example, portions which have functions substantially common to the foregoing example are represented by the same reference numerals, and detailed description thereof will not be repeated.

Figure 5:
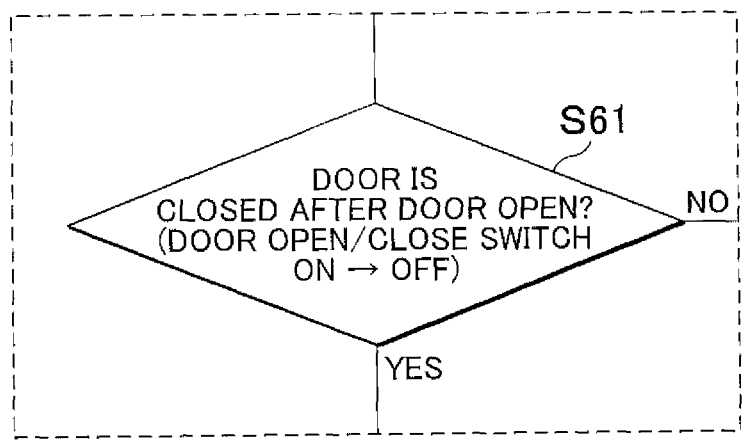
FIG. 5 is a flowchart illustrating a main part of control operation of a parking lock control computer of another example.

In this example, the functions of the parking lock control computer 108 have functions substantially common to the above-described functions except that the door operation parking lock control unit 128 has a different control function. Hereinafter, the difference will be described referring to FIG. 5. FIG. 5 is a flowchart illustrating a main part of a control operation of the parking lock control computer 108. In the control operation of the parking lock control computer 108 of this example, the control operation of S6 of FIG. 4 described above is substituted with a control operation of S61 of FIG. 5. S61 corresponding to the function of the door operation parking lock control unit 128 is executed in a case where the determination of S5 corresponding to the function of the parking lock permission unit 134 is affirmative. In S61, it is determined whether or not an operation (hereinafter, referred to a "door closing operation") to close the door after opening the door is performed based on switching to OFF after the door open signal representing the door open state Don from the door open/close switch 118 is switched from OFF to ON. The door operation parking lock control unit 128 switches the traveling control mode from the N mode to the P mode and brings the parking lock mechanism 37 into the parking lock state at the time of the door closing operation in a state where the door operation P lock permission signal output from the parking lock permission unit 134 is supplied in a case where the vehicle speed V is equal to or lower than the P lock permissible vehicle speed Vp and the parking lock rejection history is stored. For this reason, when there is a parking request based on a driver's manual operation of the P switch 114 or the vehicle power switch 122, in a case where the P switch 114 or the vehicle power switch 122 is operated in a state where the vehicle speed V exceeds the P lock permissible vehicle speed Vp and the parking lock operation is inhibited, the parking lock mechanism 37 is switched to the parking lock state by the door closing operation. With this, it is possible to obtain the same effects as those in Example 1 described above.

Although the embodiment has been described in detail referring to the drawings, the embodiment may also be embodied in different forms, with various alterations without departing from the spirit and scope of the invention.

For example, according to the parking lock control computer 108 of Example 1 described above, although the determination of whether or not the predetermined conditions for starting the auto P lock control at the time of Ready-OFF are established is performed by the power supply control computer 120, and the Ready-OFF auto P lock switching request signal is supplied from the power supply control computer 120 to the manual operation parking lock control unit 126 of the parking lock control computer 108, the invention is not limited thereto, and for example, the predetermined conditions may be determined by the parking lock control computer 108.

A part or all of the door operation parking lock control unit 128, the parking lock rejection history storage unit 132, and the parking lock permission unit 134 may be provided in the power supply control computer 120.

The above description is merely an embodiment and, although not exemplarily illustrated one by one, the invention may be implemented in variously modified and improved forms based on the knowledge of those skilled in the art without departing from the spirit and scope of the invention.

What is claimed is:

1. A control device for a vehicle, the vehicle including
a parking lock mechanism,
a parking lock operating device on which an operation input is performed manually, and
an actuator configured to operate in response to a command from the parking lock operating device, and
the control device comprising a processor programmed to:
execute parking lock operation to switch the parking lock mechanism to a parking lock state by the actuator at a vehicle speed equal to or lower than a predetermined vehicle speed,
execute the parking lock operation based on an operation of a door of the vehicle,
inhibit the parking lock operation when the parking lock operating device is operated in a state where the vehicle speed exceeds the predetermined vehicle speed,
store information indicating that the parking lock operation is inhibited as a parking lock rejection history until the vehicle is brought into a traveling mode state, and
permit the parking lock operation in a case where the vehicle speed is equal to or lower than the predetermined vehicle speed and the parking lock rejection history is stored.

2. The control device according to claim 1, wherein the operation of the door of the vehicle is an operation to open the door of the vehicle.

3. The control device according to claim 1, wherein the operation of the door of the vehicle is an operation to close the door after opening the door of the vehicle.

4. The control device according to claim 1,
wherein the parking lock operating device is a parking switch, and the processor is further programmed to store the information indicating that the parking lock operation is inhibited as the parking lock rejection history based on manually performing the operation input on the parking switch.

5. The control device according to claim 1,
wherein the parking lock operating device is a vehicle power switch, and
the processor is further programmed to store the information indicating that the parking lock operation is inhibited as the parking lock rejection history based on manually performing the operation input on the vehicle power switch when a power supply state of the vehicle is ready-off.

6. The control device according to claim 1,
wherein the parking lock operating device is an automatic return pushbutton switch configured such that an operating member of the automatic return pushbutton switch returns to an original position when operating force to the operating member is released.

* * * * *